(12) United States Patent
Turchi et al.

(10) Patent No.: US 10,097,082 B1
(45) Date of Patent: Oct. 9, 2018

(54) OFFLINE POWER CONVERTER WITH INTEGRAL LINE SENSING

(71) Applicant: SEMICONDUCTOR COMPONENTS INDUSTRIES, LLC, Phoenix, AZ (US)

(72) Inventors: Joel Turchi, Gagnac sur Garonne (FR); Christophe Basso, Pibrac (FR)

(73) Assignee: SEMICONDUCTOR COMPONENTS INDUSTRIES, LLC, Phoenix, AZ (US)

(*) Notice: Subject to any disclaimer, the term of this patent is extended or adjusted under 35 U.S.C. 154(b) by 0 days.

(21) Appl. No.: 15/623,810

(22) Filed: Jun. 15, 2017

(51) Int. Cl.
  *H03B 1/00* (2006.01)
  *H03K 3/00* (2006.01)
  *H02M 1/42* (2007.01)
  *H02M 1/08* (2006.01)
  *H02M 3/156* (2006.01)
  *H03K 3/017* (2006.01)

(52) U.S. Cl.
  CPC .......... *H02M 1/4208* (2013.01); *H02M 1/08* (2013.01); *H02M 3/156* (2013.01); *H03K 3/017* (2013.01)

(58) Field of Classification Search
  CPC ...... H02M 1/4208; H02M 1/08; H02M 3/156; H02M 7/003; G05F 1/565; H03K 3/017
  USPC ........ 327/108–112, 170, 172–177, 427, 434, 327/437; 326/82, 83, 87; 323/243, 274, 323/275, 284, 285; 363/147
  See application file for complete search history.

(56) References Cited

U.S. PATENT DOCUMENTS

| 5,359,281 | A | 10/1994 | Barrow et al. | |
|---|---|---|---|---|
| 7,893,663 | B2 | 2/2011 | Ng | |
| 9,048,752 | B2* | 6/2015 | Capilla | H02M 1/4225 |
| 2002/0089860 | A1* | 7/2002 | Kashima | H02M 3/156 |
| | | | | 363/13 |
| 2004/0120094 | A1* | 6/2004 | Satoh | H01F 7/18 |
| | | | | 361/160 |
| 2011/0038188 | A1 | 2/2011 | Choi | |

FOREIGN PATENT DOCUMENTS

WO  2011144981 A1  11/2011

OTHER PUBLICATIONS

Actions on the Merits in copending U.S. Appl. No. 15/624,298.
(Continued)

*Primary Examiner* — Thomas Skibinski
(74) *Attorney, Agent, or Firm* — Polansky & Associates, P.L.L.C.; Paul J. Polansky (57) ABSTRACT

An integrated circuit power factor controller includes a pulse width modulator and a line sensing circuit. The pulse width modulator has a first input for receiving a feedback signal, a second input for receiving a line sense signal, and an output for providing a drive signal having a duty cycle formed in response to the feedback signal and the line sense signal. The line sensing circuit has an input for receiving the drive signal, and an output coupled to the second input of the pulse width modulator for providing the line sense signal. The line sensing circuit forms the line sense signal in response to measuring a duty ratio of the drive signal. In another form, an offline converter includes an integrated circuit power factor controller that provides a line sense signal in response to a duty ratio of the drive signal without measuring a voltage on the input line.

29 Claims, 5 Drawing Sheets

(56) References Cited

OTHER PUBLICATIONS

FAN7930; "Critical Conduction Mode PFC Controller"; Product Data Sheet; Fairchild Semiconductor Corporation; Apr. 2010; 24 pages.; FAN7930 Rev 1.0.1; Fairchild Semiconductor Corporation, 1272 Borregas Avenue, Sunnyvale, CA 94089 United States.

UC3854; "High Power Factor Preregulator"; Product Data Sheet; Unitrode Corporation; Mar. 2006; 11 pages; Unitrode Corporation, 7 Continental Blvd., Merrimack, NH 03054 United States.

NCP1653; "Compact, Fixed-Frequency,Continuous Conduction Mode PFC Controller"; Product Data Sheet; Semiconductor Components Industries, LLC; May 2015; 21 pages; NCP1653/D Rev. 10; Semiconductor Components Industries, LLC, P.O. Box 5163, Denver, Colorado 80217 United States.

NCP1650; "Power Factor Controller"; Product Data Sheet; Semiconductor Components Industries, LLC; Mar. 2015; 31 pages; NCP1650/D Rev. 13; Semiconductor Components Industries, LLC, P.O. Box 5163, Denver, Colorado 80217 United States.

NCP1602; "Enhanced, High-Efficiency Power Factor Controller"; Product Data Sheet; Semiconductor Components Industries, LLC; Oct. 2015; 32 pages; NCP1602/D Rev. 0; Semiconductor Components Industries, LLC, P.O. Box 5163, Denver, Colorado 80217 United States.

NCP1250; "Current-Mode PWM Controller for Off-line Power Supplies"; Product Data Sheet; Semiconductor Components Industries, LLC; Apr. 2015; 24 pages; NCP1250/D Rev. 10; Semiconductor Components Industries, LLC, P.O. Box 5163, Denver, Colorado 80217 United States.

MC34262, MC33262 "Power Factor Controllers"; Product Data Sheet; Semiconductor Components Industries, LLC; Apr. 2013; 19 pages; MC34262/D Rev. 14; Semiconductor Components Industries, LLC, P.O. Box 5163, Denver, Colorado 80217 United States.

L6561; "Power Factor Corrector"; Product Data Sheet; Stmicroelectronics; Jun. 2004; 13 pages; Rev. 10; STEMicroelectronics, 39, Chemin du Champ des Filles, C. P. 21, CH 1228 Plan-Les-Ouates, Geneva, Switzerland.

\* cited by examiner

OFFLINE POWER CONVERTER WITH INTEGRAL LINE SENSING

CROSS-REFERENCE TO RELATED APPLICATION

Related subject matter is found in a copending patent application entitled "Offline Power Converter with Multiplier", U.S. patent application Ser. No. 15/624,298, filed Jul. 15, 2017, invented by Joel Turchi and Christophe Basso and assigned to the assignee hereof.

FIELD OF THE DISCLOSURE

The present disclosure relates generally to power conversion circuits, and more particularly to offline converters such as power factor controllers.

BACKGROUND

Offline converters receive a voltage from an alternating current (AC) line and form a bulk voltage, which may then be converted into a different voltage for use by low-voltage circuitry. Typically a full-wave AC input voltage is converted into a half wave rectified voltage and smoothed before being converted into a lower voltage. One particularly useful feature for offline converters is power factor control. A power factor controller may be used in an offline converter to ensure that power is being efficiently delivered to a load with a high power factor by keeping the voltage and current waveforms in phase.

When operating, the power factor controller implements various voltage feed-forward and protection functions based on the level of the input voltage. For example, the power factor controller can sense a low line condition and adjust the on-time of a switch in response. The power factor controller can also detect a brownout condition in which it senses an abnormally low line for an extended time and take appropriate remedial actions. While these feed-forward and protection functions are useful, they use an integrated circuit terminal to sense the line voltage.

BRIEF DESCRIPTION OF THE DRAWINGS

The present disclosure may be better understood, and its numerous features and advantages made apparent to those skilled in the art by referencing the accompanying drawings, in which.

The use of the same reference symbols in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION

Figure 1:
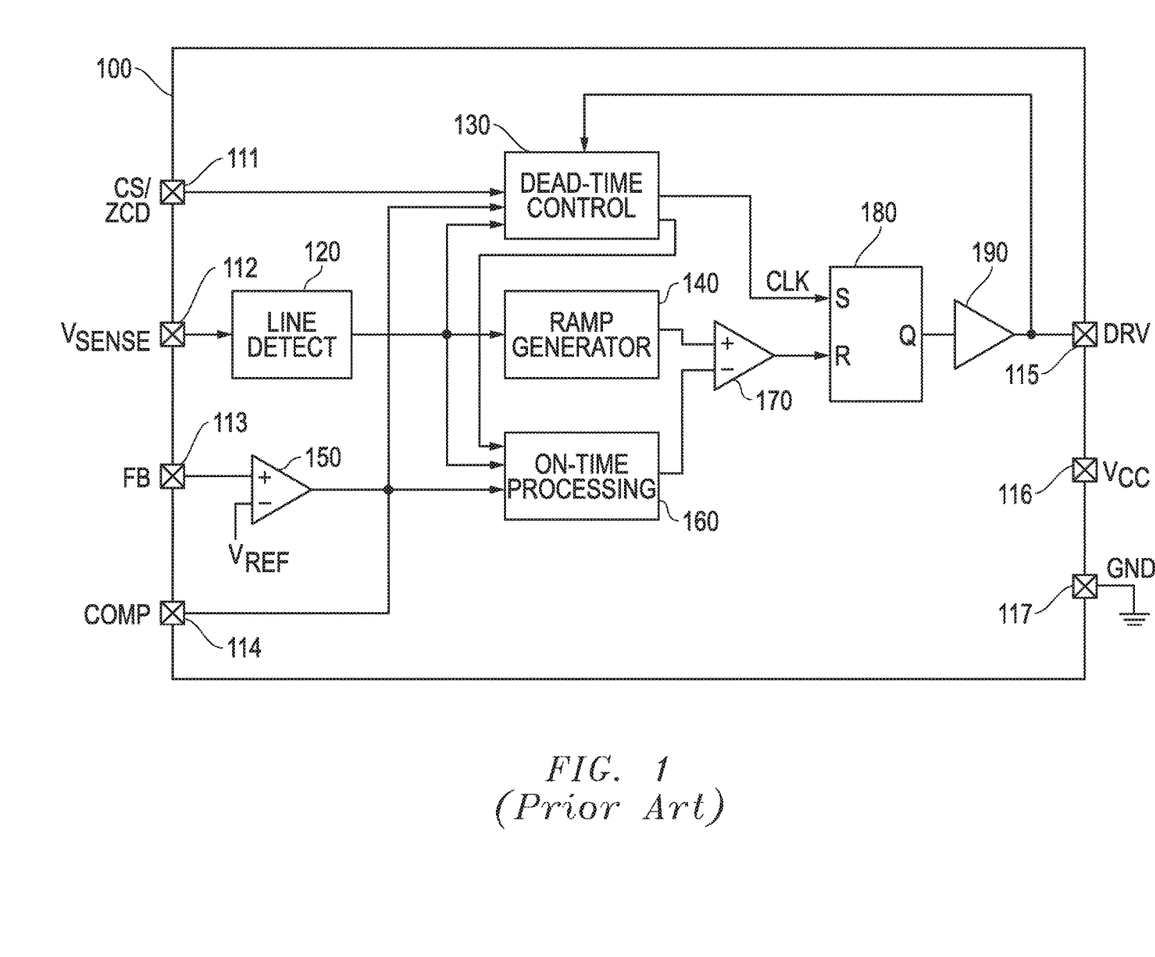
FIG. 1 illustrates in block diagram form an integrated circuit power factor controller known prior art.

FIG. 1 illustrates in block diagram form an integrated circuit power factor controller 100 known prior art. Integrated circuit power factor controller 100 includes a set of integrated circuit terminals 110, a line detect circuit 120, a dead-time control circuit 130, a ramp generator 140, an error amplifier 150, an on-time processing circuit 160, a comparator 170, a latch 180, and a buffer 190.

Integrated circuit power factor controller 100 has seven terminals 110, including a current sense/zero current detect terminal 111 labeled "CS/ZCD", a line voltage sense terminal 112 labeled "$V_{SENSE}$", a feedback terminal 113 labeled "FB", a compensation terminal 114 labeled "COMP", a drive terminal 115 labeled "DRV", a positive power supply voltage terminal 116 labeled "$V_{CC}$", and a ground terminal 117 labeled "GND". Line detect circuit 120 has an input connected to line voltage sense terminal 112, and an output. Dead-time control circuit 120 has a first input connected to current sense/zero current detect terminal 111, a second input connected to compensation terminal 114, a third input connected to the output of line detect circuit 120, a fourth input, a first output for providing a signal labeled "CLK", and a second output. Ramp generator 140 has an input connected to the output of line detect circuit 120, and an output. Error amplifier 150 has a non-inverting input connected to feedback terminal 113, an inverting input for receiving a voltage labeled "$V_{REF}$", and an output connected to compensation terminal 114. On-time processing circuit 160 has a first input connected to the second output of dead-time control circuit 130, a second input connected to the output of line detect circuit 120, a third input connected to the output of error amplifier 150, and an output. Comparator 170 has a positive input connected to the output of ramp generator 140, a negative input connected to the output of on-time processing circuit 160, and an output. Latch 180 has a set input labeled "S" connected to the first output of dead-time control circuit 130, a reset input labeled "R" connected to the output of comparator 170, and an output labeled "Q". Driver 190 has an input connected to the output of latch 180, and an output connected to the fourth input of dead-time control circuit 130 and to drive terminal 115.

In operation, integrated circuit power factor controller 100 is part of an offline converter that modulates the conduction of an external transistor (not shown in FIG. 1) whose gate is connected to drive terminal 115 in order to deliver power to a load with a high power factor. The first terminal of the external transistor receives a smoothed haversine waveform. Integrated circuit power factor controller 100 uses the ripple in the rectified AC line voltage to adjust current sense limits to keep the voltage and current waveforms delivered to the load in phase, as well as for protection from abnormal line conditions.

The offline converter typically generates $V_{SENSE}$ as a fraction of the AC line voltage, and line detect circuit 120 uses $V_{SENSE}$ to detect certain abnormal conditions including low-line and brownout conditions. For example, ramp generator 140 modifies the ramp signal in response to a low line condition, and on-time processing circuit 160 causes the DRV signal to be off in response to a brownout condition.

Dead-time control circuit 130 uses the CS/ZCD input to detect a core reset of an external inductor and to provide a current limit protection function. Dead-time control circuit 130 uses the CS/ZCD signal as a zero current detect signal to modulate the dead-time of the DRV signal and to selectively generate the CLK signal to latch 180. It uses the CS/ZCD signal as a current sense signal to detect that the current through the external transistor has reached its limit and to cause on-time processing circuit to deactivate the DRV signal in response.

Ramp generator 140 provides a ramp signal to its output that is used to set the on-time of the external transistor. Upon detection of a low line condition, it causes the power factor controller to operate an a discontinuous conduction mode (DCM) by keeping the DRV signal inactive even after a core reset of the external inductor.

The offline converter generates the FB signal as a fraction of the rectified input voltage. Integrated circuit power factor controller 100 uses error amplifier 150 to develop an error signal proportional to the difference between FB and $V_{REF}$ in order to regulate the output voltage to a desired level. Compensation terminal 114 provides a connection point between the output of error amplifier 150 and an off-chip compensation network that is provided for loop stability. On-time processing circuit 160 combines the error signal, the line sense signal, and information about the state of the transformer to generate an on-time voltage reference level. Comparator 170 uses the on-time reference level and the ramp signal generated by ramp generator 140 to determine the on-time of the external transistor by determining when to reset latch 180.

Integrated circuit power factor controller 100 may include several additional protection mechanisms that are not described here in detail.

While integrated circuit power factor controller 100 achieves high power factor, it requires several external terminals to develop that various signals to control its operation. As will now be described, the inventors have developed a way to provide the same function but to reduce the terminal count, thus reducing the cost of the offline converter.

Figure 2:
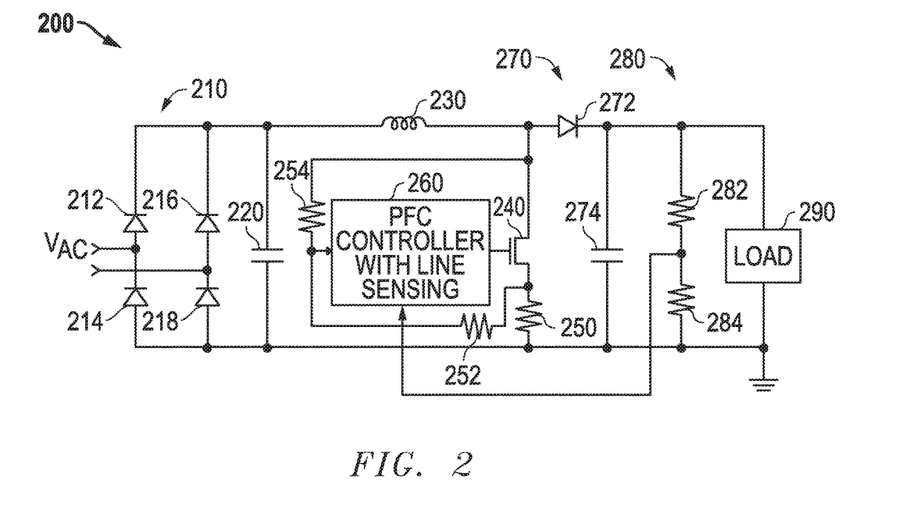
FIG. 2 illustrates in partial block diagram and partial schematic form an offline converter having an integrated circuit power factor controller according to an embodiment of the present invention.

FIG. 2 illustrates in partial block diagram and partial schematic form an offline converter 200 having an integrated circuit power factor controller 260 according to an embodiment of the present invention. Offline converter 200 includes a bridge rectifier 210, a capacitor 220, an inductor 230, a transistor 240, a sense resistor 250, resistors 252 and 254, integrated circuit power factor controller 260, a an output circuit 270, a feedback circuit 280, and a load 290.

Bridge rectifier 210 includes diodes 212, 214, 216, and 218. Diode 212 has an anode for receiving a first component of an AC input voltage labeled "$V_{AC}$", and a cathode. Diode 214 has an anode connected to ground, and a cathode connected to the anode of diode 212. Diode 216 has an anode for receiving a second component of $V_{AC}$, and a cathode connected to the cathode of diode 212. Diode 218 has an anode connected to ground, and a cathode connected to the anode of diode 216.

Capacitor 220 has a first terminal connected to the cathodes of diodes 212 and 216, and a second terminal connected to ground. Inductor 230 has a first terminal connected to the cathodes of diodes 212 and 216, and a second terminal. Transistor 240 is an N-channel power metal-oxide-semiconductor (MOS) transistor having a drain connected to the second terminal of inductor 230, and gate, and a source. Resistor 250 has a first terminal connected to the source of transistor 240, and a second terminal connected to ground. Resistor 252 has a first terminal connected to the source of transistor 240, and a second terminal. Resistor 254 has a first terminal connected to the second terminal of resistor 252, and a second terminal connected to the second terminal of inductor 230.

Integrated circuit power factor controller 260 has a first input connected to the second terminal of resistor 252, a second input, and an output connected to the gate of transistor 240.

Output circuit 270 includes a diode 272 and a capacitor 274. Diode 272 has an anode connected to the second terminal of inductor 230, and a cathode for providing a power factor compensated voltage labeled "$V_{BULK}$". Capacitor 274 has a first terminal connected to the cathode of diode 272, and a second terminal connected to ground.

Feedback circuit 280 includes resistors 282 and 284. Resistor 282 has a first terminal connected to the cathode of diode 272, and a second terminal connected to the first input of integrated circuit power factor controller 260. Resistor 284 has a first terminal connected to the second terminal of resistor 282, and a second terminal connected to ground.

Load 290 has a first terminal connected to the cathode of diode 272, and a second terminal connected to ground.

In operation, bridge rectifier 210 converts the full-wave $V_{AC}$ signal into a half-wave rectified (haversine) signal. Capacitor 220 smoothes the large ripple in the haversine signal to provide a smoothed haversine signal. Inductor 230 provides further smoothing of the haversine signal by storing energy during the on-time of the transistor 240, and delivering the stored energy to load 290 during the off-time of transistor 240. Diode 272 and capacitor 274 further rectify and smooth the power factor corrected signal to form $V_{BULK}$. Feedback circuit 280 generates a feedback voltage as a fraction of $V_{BULK}$.

Integrated circuit power factor controller 260 is configured in a boost architecture and modulates the conductivity of transistor 240 to deliver power to a load with a high power factor. It uses the feedback signal generated by feedback circuit 280 in voltage-mode control to modulate the on-time of transistor 240, and determines both the current through transistor 240 sensed by resistor 250, and the magnetization state of inductor 230.

A conventional power factor controller such as integrated circuit power factor controller 100 of FIG. 1 requires an additional input terminal to sense the line voltage for on-time control and high- and low-line sensing and protection. The additional terminal increases the cost of both the power factor controller chip and the board. Integrated circuit power factor controller 260, however, includes an integral line sensing function that is accomplished without the use of sense signal received on an external terminal, thereby saving product cost. How integrated circuit power factor controller 260 performs line sensing will now be described.

Figure 3:
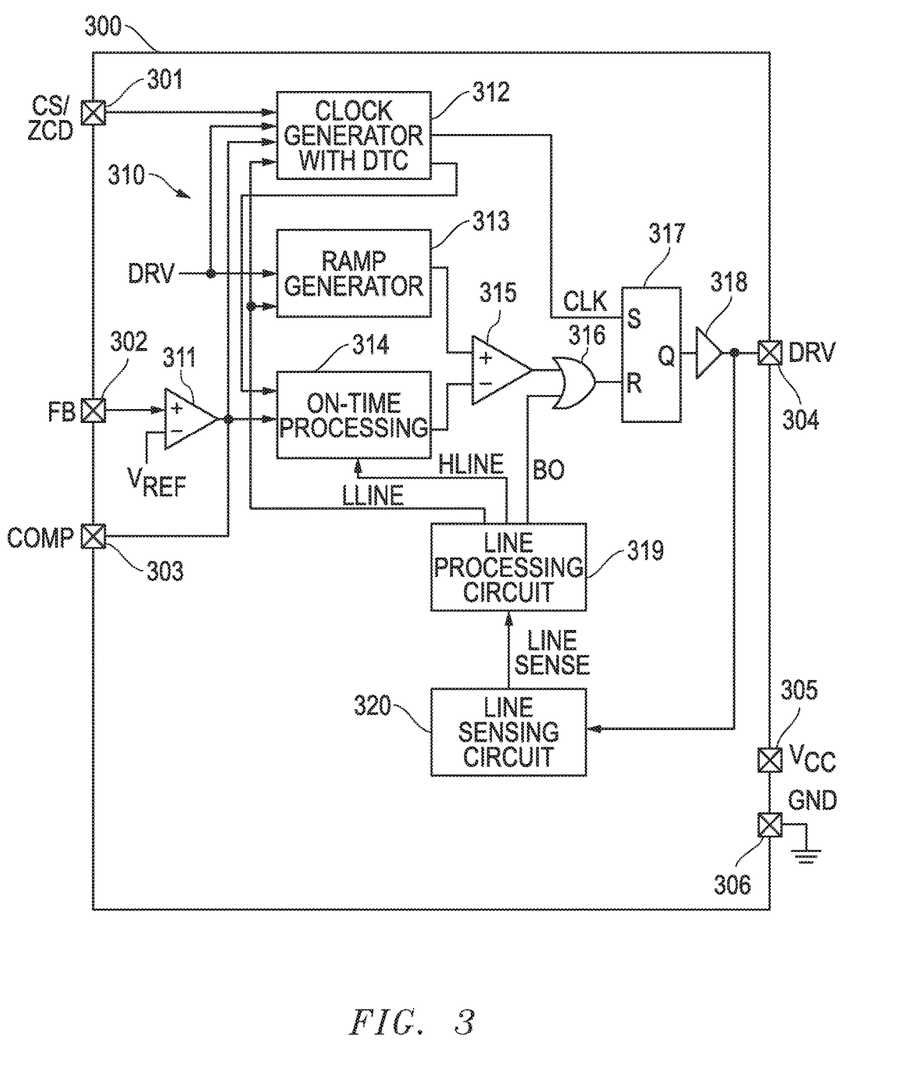
FIG. 3 illustrates in block diagram form an integrated circuit power factor controller that can be used as the integrated circuit power factor controller of FIG. 2.

FIG. 3 illustrates in block diagram form an integrated circuit power factor controller 300 that can be used as integrated circuit power factor controller 260 of FIG. 2. Integrated circuit power factor controller 300 includes generally a set of terminals 301-306, a pulse width modulator 310, and a line sensing circuit 320. The terminals include a current sense/zero current detect terminal 301 (CS/ZCD), a feedback terminal 302 (FB), a compensation terminal 303 (COMP), a drive terminal 304 (DRV), a positive power supply voltage terminal 305 ($V_{CC}$), and a ground terminal 306 (GND).

Pulse width modulator 310 includes an error amplifier 311, a clock generator with dead time control (DTC) circuit 312, a ramp generator 313, an on-time processing circuit 314, a comparator 315, an OR gate 316, a latch 317, a driver 318, and a line processing circuit 319. Error amplifier 311 has a non-inverting input connected to feedback terminal 302, an inverting input for receiving voltage $V_{REF}$, and an output connected to compensation terminal 303. Clock generator with DTC block 312 has a first input connected to terminal 301, a second input for receiving the DRV signal, a third input connected to the output of error amplifier 311, a fourth input for receiving a signal labeled "LLINE" a first output for providing the CLK signal, and a second output for providing a dead time signal. Ramp generator 313 has a first input for receiving the DRV signal, a second input for receiving the LLINE signal, and an output. On-time processing circuit 314 has a first input connected to the second output of clock generator with DTC circuit 312, a second input connected to the output of error amplifier 150, a third input for receiving a signal labeled "HLINE", and an output. Comparator 315 has a positive input connected to the output of ramp generator 313, a negative input connected to the output of on-time processing circuit 314, and an output. OR gate 316 has a first input connected to the output of comparator 315, a second input for receiving a signal labeled "BO_NOK", and an output. Latch 317 in an SR latch having a set input S connected to the first output of clock generator with DTC block 312, a reset input R connected to the output of OR gate 316, and an output Q. Driver 318 has an input connected to the output of latch 317, and an output connected drive terminal 304 for providing the DRV signal. Line processing circuit 319 has an input for receiving a signal labeled "LINE SENSE", a first output connected to the fourth input of clock generator with DTC circuit 312 and to the second input of ramp generator 313 for providing the LLINE signal, a second output connected to the third input of on-time processing circuit 314 for providing the HLINE signal, and a third output connected to the second input of OR gate 316 for providing the BO_NOK signal.

Line sensing circuit 320 has an input connected to the output of driver 318 for receiving the DRV signal, and an output connected to the input of line processing circuit 319 for providing the LINE SENSE signal.

In operation, integrated circuit power factor controller 300 is part of an offline converter that modulates the conduction of transistor 240 whose gate is connected to drive terminal 304 in order to deliver power to load 290 with a high power factor.

Error amplifier 311 develops an error signal proportional to the difference between FB and $V_{REF}$ in order to regulate the output voltage to a desired level. Compensation terminal 303 provides a connection point between the output of error amplifier 311 and an off-chip compensation network that is used for loop stability.

Clock generator with DTC circuit 312 uses the CS/ZCD input to detect the inductor reset and to provide a current limit protection function. It uses the CS/ZCD signal as a zero current detect signal to modulate the dead-time of the DRV signal and to selectively generate the CLK signal to latch 180. It uses the CS/ZCD signal as a current sense signal to detect that the current through the external transistor has reached its limit and to cause on-time processing circuit 314 to deactivate the DRV signal in response. Clock generator with DTC circuit 312 also uses the DRV signal and the error signal to determine when to provide the CLK signal to latch 317.

Ramp generator 313 provides a ramp signal to its output to determine the on-time of transistor 240. Upon receiving the LLINE signal, it causes the power factor controller to operate in a discontinuous conduction mode (DCM) by keeping the DRV signal inactive even after the inductor current has fallen to zero.

On-time processing circuit 314 processes the error signal and the LLINE signal to generate an on-time voltage reference level. Comparator 315 uses the on-time voltage reference level and the ramp signal generated by ramp generator 313 to determine the on-time of the external transistor by determining when to reset latch 180. During a brownout condition in response to a low LINE SENSE voltage, line processing circuit 319 activates the BO_NOK signal, which also causes latch 317 to be reset.

Integrated circuit power factor controller 300 may include several additional protection mechanisms that are not described here in detail.

Unlike integrated circuit power factor controller 100, however, integrated circuit power factor controller 300 does not require a separate $V_{SENSE}$ terminal to sense the line voltage. Instead, line sensing circuit 320 performs integral line sensing based on information contained in the DRV signal itself.

The off-time duty cycle $D_{OFF}$ is proportional to the line voltage, regardless of whether the power factor controller is operating in continuous conduction mode (CCM), critical conduction mode (CrM), or discontinuous conduction mode (DCM).

In CCM and CrM, there are two phases. During the on-time of transistor 240, a time-varying input voltage $V_{IN}(t)$ is applied between the first and second terminals of inductor 230. During the off-time of transistor 240, a voltage equal to $V_{BULK}-V_{IN}(t)$ is applied between the second and first terminals of inductor 230. Applying the volt-balance law:

$$V_{IN}(t) \cdot t_{ON} = (V_{BULK} - V_{IN}(t)) \cdot t_{OFF} \quad [1]$$

in which $t_{ON}$ is the on-time of transistor 240, and $t_{OFF}$ is the off-time of transistor 240. Rearranging equation [1]:

$$V_{IN}(t) \cdot (t_{ON} + t_{OFF}) = V_{BULK} \cdot t_{OFF} \quad [2]$$

In CCM or CrM, there is no dead time and thus $t_{ON} + t_{OFF} = T_{SW}$. Hence:

$$D_{OFF} = \frac{t_{OFF}}{t_{ON} + t_{OFF}} = \frac{V_{IN}(t)}{V_{BULK}} \quad [3]$$

in which $D_{OFF}$ is the off-time duty ratio of transistor 240. Assuming $V_{BULK}$ is substantially constant, then the off-time duty ratio $D_{OFF}$ is proportional to the instantaneous input voltage.

In DCM, there are three phases: the on-time designated "$d_1$", the off-time designated "$d_2$", and the dead time designated "$d_3$", in which $d_1 = t_{ON}/T_{SW}$, $d_2 = t_{OFF}/T_{SW}$, and $d_3 = t_{DT}/T_{SW}$. Note that the off-time duty ratio $D_{OFF}$ is different than $d_2$ because of the dead time, and can be expressed as:

$$D_{OFF} = \frac{t_{OFF}}{t_{ON} + t_{OFF}} = \frac{t_{OFF}}{T_{SW} - t_{DT}} \quad [4]$$

in which $t_{DT}$ is the dead time. Applying the volt-balance law:

$$V_{IN}(t) \cdot t_{ON} - (V_{BULK} - V_{IN}(t)) \cdot t_{OFF} + 0 \cdot t_{DT} = 0 \quad [5]$$

As before:

$$D_{OFF} = \frac{t_{OFF}}{t_{ON}+t_{OFF}} = \frac{V_{IN}(t)}{V_{BULK}} \quad [6]$$

Again assuming $V_{BULK}$ is substantially constant, then the off-time duty ratio $D_{OFF}$ in DCM is also proportional to the instantaneous input voltage.

Line sensing circuit 320 provides the LINE SENSE signal by measuring $D_{OFF}$ from the on- and off-time of the DRV signal and without using an explicit line sense signal. Thus integrated circuit power factor controller 300 performs the same protection and line feed-forward functions as integrated circuit power factor controller 100 but with lower integrated circuit and circuit board cost. The way in which line sensing circuit 320 determines $D_{OFF}$ will now be described.

Figure 4:
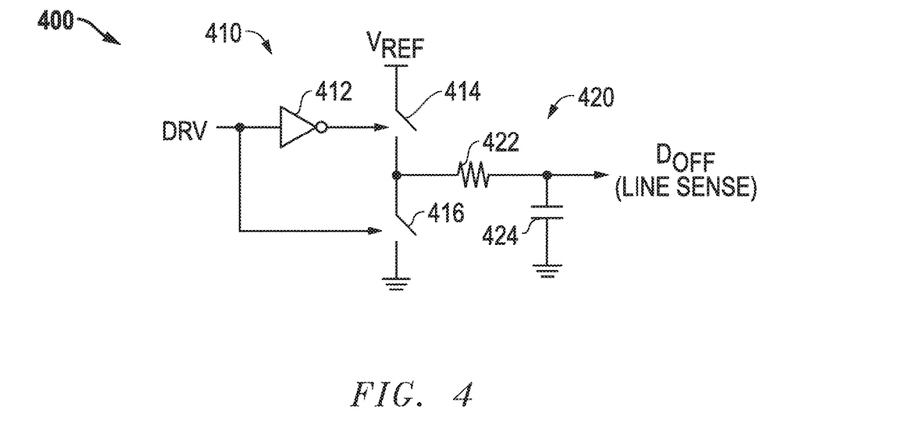
FIG. 4 illustrates in schematic form a line sensing circuit that can be used as the line sensing circuit of FIG. 3.

FIG. 4 illustrates in schematic form a line sensing circuit 400 that can be used as line sensing circuit 320 of FIG. 3. Line sensing circuit 400 includes generally a switch circuit 410 and an integrator 420.

Switch circuit 410 includes an inverter 412 and switches 414 and 416. Inverter 412 has an input for receiving the DRV signal, and an output. Switch 414 has a first terminal for receiving $V_{REF}$, a second terminal, and a control terminal connected to the output of inverter 412. Switch 416 has a first terminal connected to the second terminal of switch 414, a second terminal connected to ground, and a control terminal for receiving the DRV signal.

Integrator 420 includes a resistor 422 and a capacitor 424. Resistor 422 has a first terminal connected to the second terminal of switch 414, and a second terminal for providing the $D_{OFF}$ signal that integrated circuit power factor controller 300 uses as the LINE SENSE signal. Capacitor 424 has a first terminal connected to the second terminal of resistor 422, an second terminal connected to ground.

Line sensing circuit 400 provides signal $D_{OFF}$ as a line sense measurement. Switch circuit 410 alternately connects the second terminal of switch 414 between $V_{REF}$ and ground in response to the DRV signal. Integrator 420 integrates the series of high and low pulses so that it $D_{OFF}$ is an analog level representing the relative duty cycle of the DRV signal, and hence an accurate LINE SENSE signal.

In particular during $t_{ON}$, switch 414 is open and switch 416 is closed, and capacitor 424 discharges. During $t_{OFF}$, switch 414 is closed and switch 416 is open, and capacitor 424 charges. During $t_{DT}$, switches 414 and 416 are both open and capacitor 424 holds the voltage on its first terminal. Thus, $$V_{C1} = V_{DOFF} = V_{REF} \cdot \frac{t_{OFF}}{t_{ON}+t_{OFF}} = V_{REF} \cdot D_{OFF} \quad [7]$$

Thus a simple circuit can produce a voltage proportional to $V_{IN}(t)$ using only the internally generated DRV signal and without the need for a line sense input terminal. The measurement is valid for all modes of operation, i.e. for CCM, CrM, and DCM.

In an alternate embodiment, the second terminal of switch 416 can be connected to a different reference voltage terminal than ground. In this case $D_{OFF}$ would be proportional to the difference between $V_{REF}$ and this additional reference voltage terminal, and thus still proportional to $V_{IN}(t)$.

Figure 5:
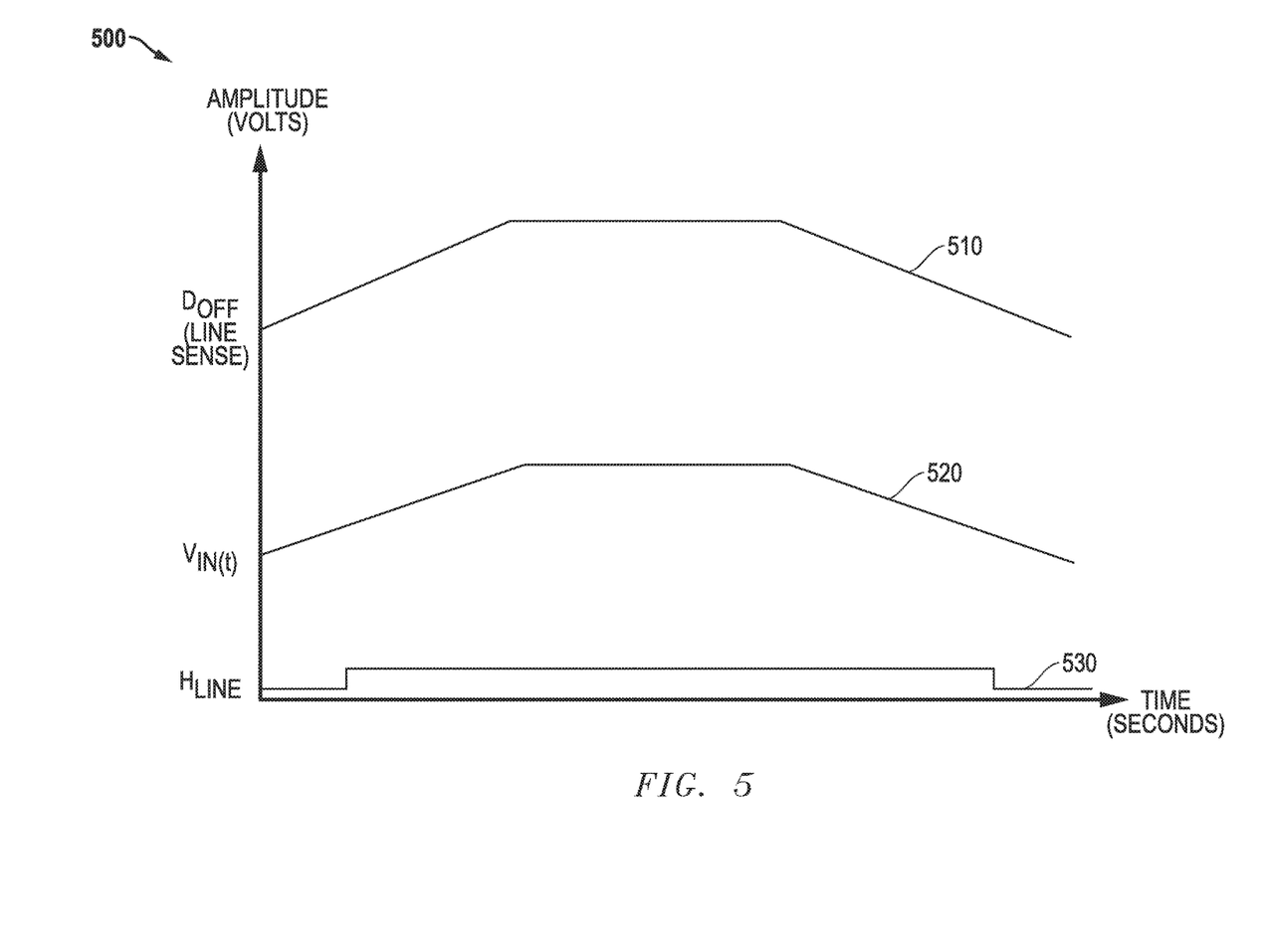
FIG. 5 illustrates a timing diagram of a simulation of the line sensing circuit of FIG. 4.

FIG. 5 illustrates a timing diagram 500 of a simulation of the line sensing circuit 400 of FIG. 4. In timing diagram 500, the horizontal axis represents time in microseconds (μs), and the vertical axis represents the magnitude in volts. Timing diagram 500 illustrates waveforms of three signals of interest, namely a first waveform 510 of $D_{OFF}$ (which is the LINE SENSE signal), a waveform 520 of $V_{IN}(t)$, and a waveform 530 of the HLINE signal. As shown in timing diagram 500, $D_{OFF}$/LINE SENSE accurately tracks $V_{IN}(t)$. This allows the HLINE signal, for example, to be generated based on DOFF/LINE SENSE instead of $V_{IN}(t)$. Thus integrated circuit power factor controller 360 is able to implement the same feed-forward and protection modes as integrated circuit power factor controller 100 of FIG. 1, without an extra line sense terminal and with only a small amount of added circuitry.

Figure 6:
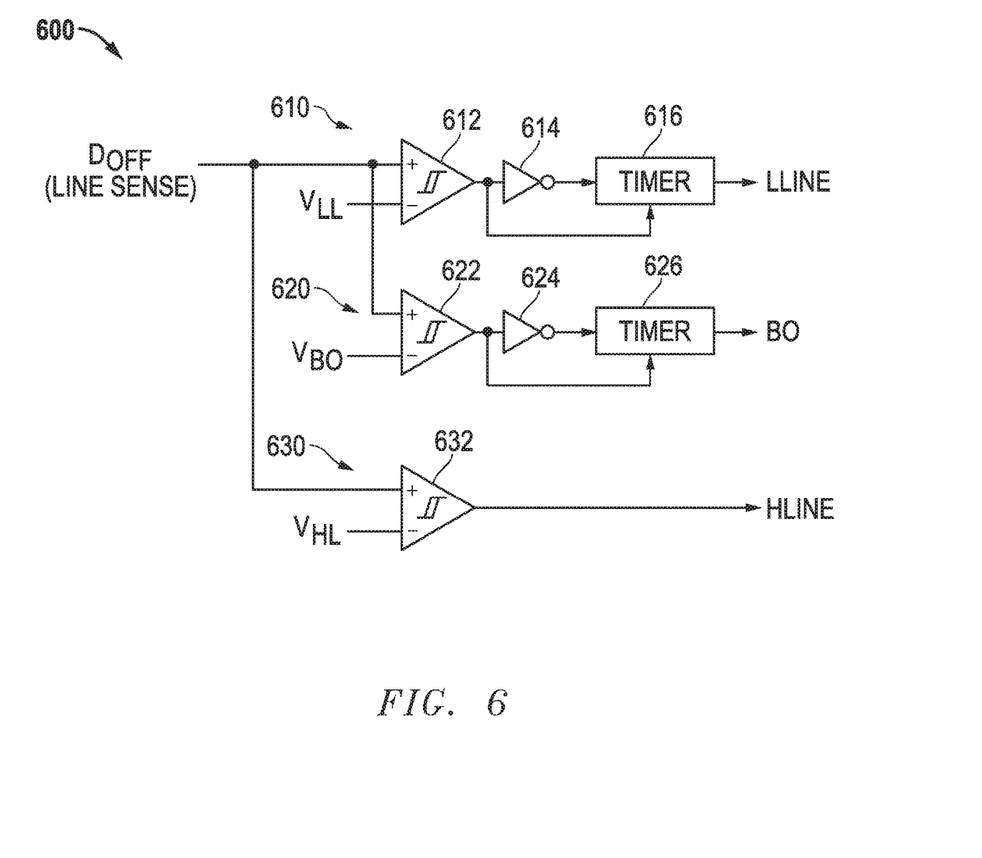
FIG. 6 illustrates in block diagram form a line processing circuit that can be used as the line processing circuit of FIG. 3.

FIG. 6 illustrates in block diagram form a line processing circuit 600 that can be used as line processing circuit 319 of FIG. 3. Line processing circuit 600 includes generally a low line detection circuit 610, a brownout detection circuit 620, and a high-line detection circuit 630.

Low line detection circuit 610 includes a hysteresis comparator 612, an inverter 614, and a timer 616. Hysteresis comparator 612 has a positive input for receiving $D_{OFF}$, a negative input for receiving a voltage labeled "$V_{LL}$", and an output. Inverter 614 has an input connected to the output of hysteresis comparator 612, and an output. Timer 616 has an input connected to the output of inverter 614, a reset input connected to the output of hysteresis comparator 612, and an output for providing signal LLINE.

Brownout detection circuit 620 includes a hysteresis comparator 622, an inverter 624, and a timer 626. Hysteresis comparator 622 has a positive input for receiving $D_{OFF}$, a negative input for receiving a voltage labeled "$V_{BO}$", and an output. Inverter 624 has an input connected to the output of hysteresis comparator 622, and an output. Timer 626 has an input connected to the output of inverter 624, a reset input connected to the output of hysteresis comparator 622, and an output for providing signal BO_NOK.

High-line detection circuit 630 includes a hysteresis comparator 632. Hysteresis comparator 632 has a positive input for receiving $D_{OFF}$, a negative input for receiving a voltage labeled "$V_{HL}$", and an output for providing the HLINE signal.

Line processing circuit 600 provides three protection signals: LLINE, BO_NOK, and HLINE. It provides each of signals LLINE and BO_NOK after $D_{OFF}$ has been in a respective state for a period of time measured by a respective timer. Timer 616 determines the amount of time that $D_{OFF}$ is less than $V_{LL}$, and activates LLINE if $D_{OFF}$ remains less than VLL for the period of timer 616 without being reset. Timer 626 determines the amount of time that $D_{OFF}$ is less than $V_{BO}$, which is lower than $V_{LL}$, and activates BO_NOK if $D_{OFF}$ remains less than VBO for the period of timer 626 without being reset. However line processing circuit 600 provides HLINE immediately if $D_{OFF}$ is greater than $V_{HL}$, which represents a more serious condition which requires the immediate protection of the offline converter.

Each hysteresis comparator may be implemented in various ways. In one embodiment, hysteresis is implemented with simple comparators and switching circuits that switch different rising and falling edge thresholds onto the negative inputs of the respective comparators based on the output of the circuit. Thus for example if LLINE is low, it switches a voltage equal to $V_{LL}$ onto the negative terminal of hysteresis comparator 612, but after LLINE goes high, it switches a voltage equal to 0.9 times $V_{LL}$ onto the negative terminal of hysteresis comparator 612.

Thus various embodiments of an offline power converter and an integrated circuit power factor controller have been described. The integrated circuit power factor controller measures the line voltage for such purposes as protection and line feed forward control by measuring the duty cycle of a transistor drive signal and thus does not require an additional line sense input terminal.

The above-disclosed subject matter is to be considered illustrative, and not restrictive, and the appended claims are intended to cover all such modifications, enhancements, and other embodiments that fall within the true scope of the claims. For example, in various embodiments all or only some of the protection mechanisms and feed-forward control using duty cycle measurement of line voltage may be implemented. Moreover the protection circuits may be implemented in various ways. While the illustrated line sense circuit uses a first-order integrator, in other embodiments different integrator circuits may be used.

Thus, to the maximum extent allowed by law, the scope of the present invention is to be determined by the broadest permissible interpretation of the following claims and their equivalents, and shall not be restricted or limited by the foregoing detailed description.

What is claimed is:

1. An integrated circuit power factor controller comprising:
   a pulse width modulator having a first input for receiving a feedback signal, a second input for receiving a line sense signal, and an output for providing a drive signal having a duty cycle formed in response to said feedback signal and said line sense signal; and
   a line sensing circuit having an input for receiving said drive signal, and an output coupled to said second input of said pulse width modulator for providing said line sense signal, wherein said line sensing circuit forms said line sense signal in response to measuring a duty ratio of said drive signal.

2. The integrated circuit power factor controller of claim 1, wherein said line sensing circuit comprises:
   a switch circuit having an input for receiving said drive signal, and an output, said switch circuit alternately coupling said output between first and second reference voltages in response to said drive signal; and
   an integrator having an input coupled to said output of said switch circuit, and an output for providing said line sense signal.

3. The integrated circuit power factor controller of claim 2, wherein said switch circuit comprises:
   an inverter having an input for receiving said drive signal, and an output;
   a first switch having a first terminal for receiving said first reference voltage, a second terminal providing said output of said switch circuit, and a control terminal coupled to said output of said inverter; and
   a second switch having a first terminal coupled to said second terminal of said first switch, a second terminal for receiving said second reference voltage, and a control terminal for receiving said drive signal.

4. The integrated circuit power factor controller of claim 2, wherein said integrator comprises:
   a resistor having a first terminal coupled to said output of said switch circuit, and a second terminal for providing said line sense signal; and
   a capacitor having a first terminal coupled to said second terminal of said resistor, and a second terminal coupled to a reference voltage terminal.

5. The integrated circuit power factor controller of claim 1, wherein said pulse width modulator comprises:
   a line processing circuit having an input for receiving said line sense signal, and an output for providing a control signal, wherein said pulse width modulator further provides said drive signal in response to said control signal.

6. The integrated circuit power factor controller of claim 5, wherein said line processing circuit senses a low line condition in response to said line sense signal being less than a low line threshold voltage for a predetermined time.

7. The integrated circuit power factor controller of claim 5, wherein said line processing circuit senses a brownout condition in response to said line sense signal being less than a brownout threshold voltage for a predetermined time.

8. The integrated circuit power factor controller of claim 5, wherein said line processing circuit senses a high line condition in response to said line sense signal being greater than a high line threshold voltage.

9. The integrated circuit power factor controller of claim 1, wherein said pulse width modulator uses said line sense signal for feed-forward control.

10. The integrated circuit power factor controller of claim 1, wherein said pulse width modulator further has a third input for receiving a current sense signal, wherein said pulse width modulator further provides said drive signal having a duty cycle formed in response to said feedback signal, said line sense signal, and said current sense signal.

11. An offline converter comprising:
    an input line for receiving a rectified AC voltage;
    a transistor having a first current electrode coupled to said input line, a second current electrode coupled to a ground terminal, and a control electrode for receiving a drive signal;
    a diode having a first terminal coupled to said input line, and a second terminal for providing an output voltage;
    an output capacitor having a first terminal coupled to said second terminal of said diode, and a second terminal coupled to said ground terminal;
    a feedback circuit for providing an output in response to a level of said output voltage; and
    an integrated circuit power factor controller having a first input terminal coupled to said output of said feedback circuit, and an output terminal for providing said drive signal, said integrated circuit power factor controller providing a line sense signal in response to a duty ratio of said drive signal without measuring a voltage on said input line, and providing said drive signal in response to said line sense signal and a first signal on said first input terminal.

12. The offline converter of claim 11, wherein said integrated circuit power factor controller comprises:
    a pulse width modulator having a first input coupled to said output of said feedback circuit, a second input for receiving said line sense signal, and an output for providing said drive signal having a duty cycle formed in response to said output of said feedback circuit and said line sense signal; and
    a line sensing circuit having an input for receiving said drive signal, and an output coupled to said second input of said pulse width modulator for providing said line sense signal.

13. The offline converter of claim 12, wherein said line sensing circuit comprises:
    a switch circuit having an input for receiving said drive signal, and an output, said switch circuit alternately coupling said output between first and second reference voltages in response to said drive signal; and an integrator having an input coupled to said output of said switch circuit, and an output for providing said line sense signal.

14. The offline converter of claim 13, wherein said switch circuit comprises:
an inverter having an input for receiving said drive signal, and an output;
a first switch having a first terminal for receiving said first reference voltage, a second terminal providing said output of said switch circuit, and a control terminal coupled to said output of said inverter; and
a second switch having a first terminal coupled to said second terminal of said first switch, a second terminal for receiving said second reference voltage, and a control terminal for receiving said drive signal.

15. The offline converter of claim 13, wherein said integrator comprises:
a resistor having a first terminal coupled to said output of said switch circuit, and a second terminal for providing said line sense signal; and
a capacitor having a first terminal coupled to said second terminal of said resistor, and a second terminal coupled to a reference voltage terminal.

16. The offline converter of claim 11, wherein said integrated circuit power factor controller comprises:
a line processing circuit having an input for receiving said line sense signal, and an output for providing a control signal, said integrated circuit power factor controller further providing said drive signal in response to said control signal.

17. The offline converter of claim 16, wherein said line processing circuit senses a low line condition in response to said line sense signal being less than a low line threshold voltage for a predetermined time.

18. The offline converter of claim 16, wherein said line processing circuit senses a brownout condition in response to said line sense signal being less than a brownout threshold voltage for a predetermined time.

19. The offline converter of claim 16, wherein said line processing circuit senses a high line condition in response to said line sense signal being greater than a high line threshold voltage for a predetermined time.

20. The offline converter of claim 16, wherein said integrated circuit power factor controller uses said line sense signal for feed-forward control.

21. The offline converter of claim 11, wherein:
said second current electrode of said transistor is coupled to said ground terminal through a current sense resistor having a first terminal coupled to said second current electrode of said transistor, and a second terminal coupled to said ground terminal; and
said integrated circuit power factor controller further has a second input terminal coupled to said first terminal of said sense resistor, and said integrated circuit power factor controller further provides said drive signal in response to said line sense signal and signals on said first input terminal and said second input terminal and said output terminal.

22. A method of controlling a power factor of an offline power converter comprising:
selectively switching an input line to a reference voltage terminal by providing a drive signal to a transistor;
measuring an output voltage generated by said selectively switching to form a feedback signal; and
sensing a line voltage based on a duty ratio of said drive signal and providing a line sense signal in response, said selectively switching comprising selectively switching said input line in response to said feedback signal and said line sense signal.

23. The method of claim 22, wherein said sensing said line voltage comprises:
alternately coupling an intermediate node between first and second reference voltages in response to said drive signal; and
integrating a voltage on said intermediate node to provide said line sense signal.

24. The method of claim 22, wherein said selectively switching comprises:
detecting a low line condition in response to said line sense signal being less than a low line threshold for a predetermined time; and
changing said selectively switching in response to said low line condition.

25. The method of claim 22, wherein said selectively switching comprises:
detecting a brownout condition in response to said line sense signal being less than a brownout threshold; and
stopping said selectively switching in response to said brownout condition.

26. The method of claim 22, wherein said selectively switching comprises:
detecting a high line condition in response to said line sense signal being greater than a high line threshold; and
changing said selectively switching in response to said high line condition.

27. The method of claim 22, wherein said selectively switching comprises:
selectively switching said input line to said reference voltage terminal using feed-forward control based on said line sense signal.

28. The method of claim 22, wherein:
said selectively switching comprises providing said drive signal to a terminal of an integrated circuit adapted to be connected to a control terminal of an external transistor; and
said sensing said line voltage based on said duty ratio of said drive signal comprises measuring said duty ratio of said drive signal without using a feedback signal from any other terminal of said integrated circuit.

29. The method of claim 22, wherein said selectively switching comprises:
selectively switching said input line to said reference voltage terminal to increase a power factor of power delivered to a load.

* * * * *